United States Patent [19]

Korson et al.

[11] Patent Number: 4,625,602
[45] Date of Patent: Dec. 2, 1986

[54] CUTTING TOOL HOLDER

[76] Inventors: John A. Korson; Bruce W. Korson, both of Rte. 1, Box 21, Suttons Bay, Mich. 49682

[21] Appl. No.: 815,733

[22] Filed: Jan. 2, 1986

[51] Int. Cl.⁴ .................................................. B23B 29/10
[52] U.S. Cl. .................................. 82/36 R; 408/151; 408/159; 408/180; 408/181
[58] Field of Search ............... 82/36 R; 408/150, 151, 408/159, 180, 181

[56] References Cited

U.S. PATENT DOCUMENTS

| | | | |
|---|---|---|---|
| 3,051,029 | 8/1962 | Cashman et al. | 82/36 R |
| 3,125,903 | 3/1964 | Briney et al. | 408/151 |
| 3,208,445 | 9/1965 | Briney | 408/151 |
| 3,232,153 | 1/1966 | Davis | 82/36 R |
| 3,283,626 | 11/1966 | Alvey et al. | 82/36 R |
| 3,296,904 | 1/1967 | Bullard | 82/36 R |
| 3,654,826 | 4/1972 | Gersch | 82/1.2 |
| 3,848,486 | 11/1974 | Robichaud | 82/36 R |
| 4,350,054 | 9/1982 | Werth | 82/36 R |
| 4,406,194 | 9/1983 | Gersch | 82/36 R |

*Primary Examiner*—Lowell A. Larson
*Assistant Examiner*—Jerry Kearns
*Attorney, Agent, or Firm*—Charles M. Kaplan

[57] ABSTRACT

A precisely adjustable cutting tool holder for a machine tool employs an eccentric shaft to directly engage and thereby to pivot a tool holding part with respect to a stationary part that is secured to the machine tool. Threaded members that engage another eccentrically oriented member may be used to minimize backlash between moving parts of the mechanism.

19 Claims, 5 Drawing Figures

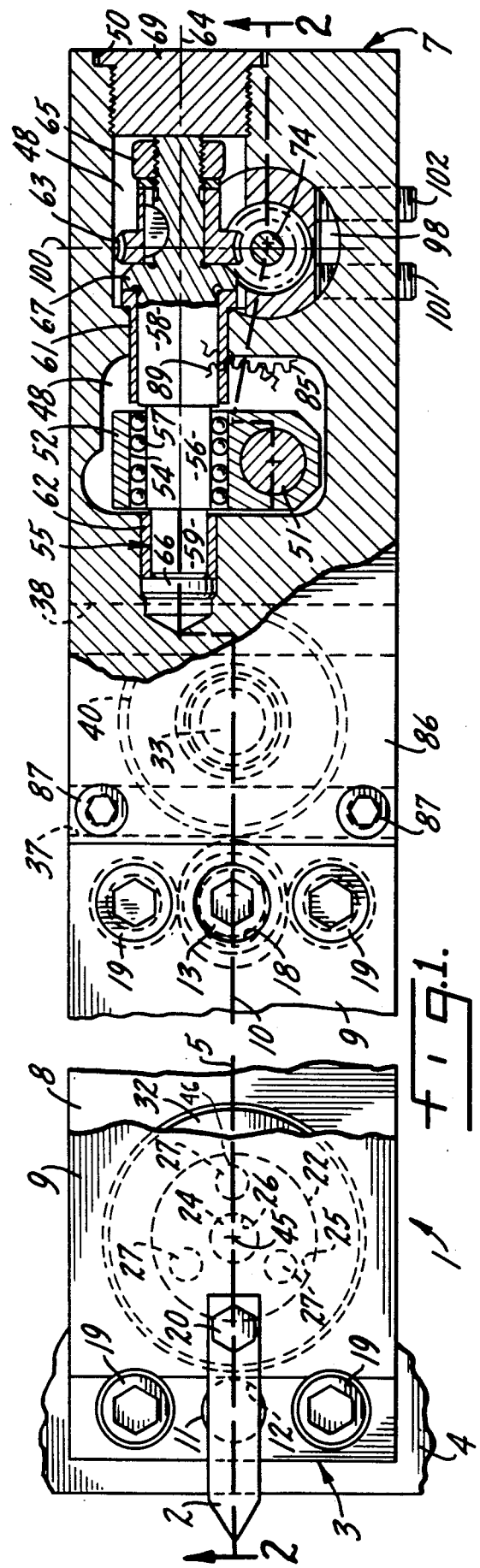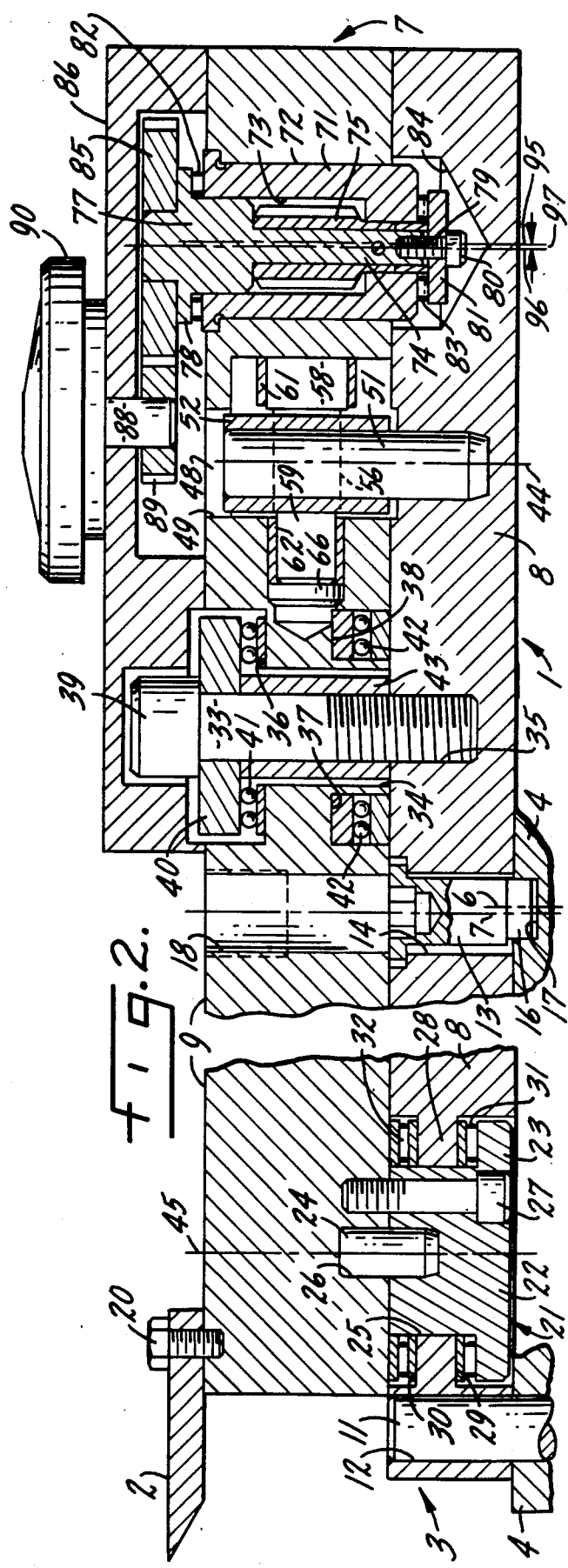

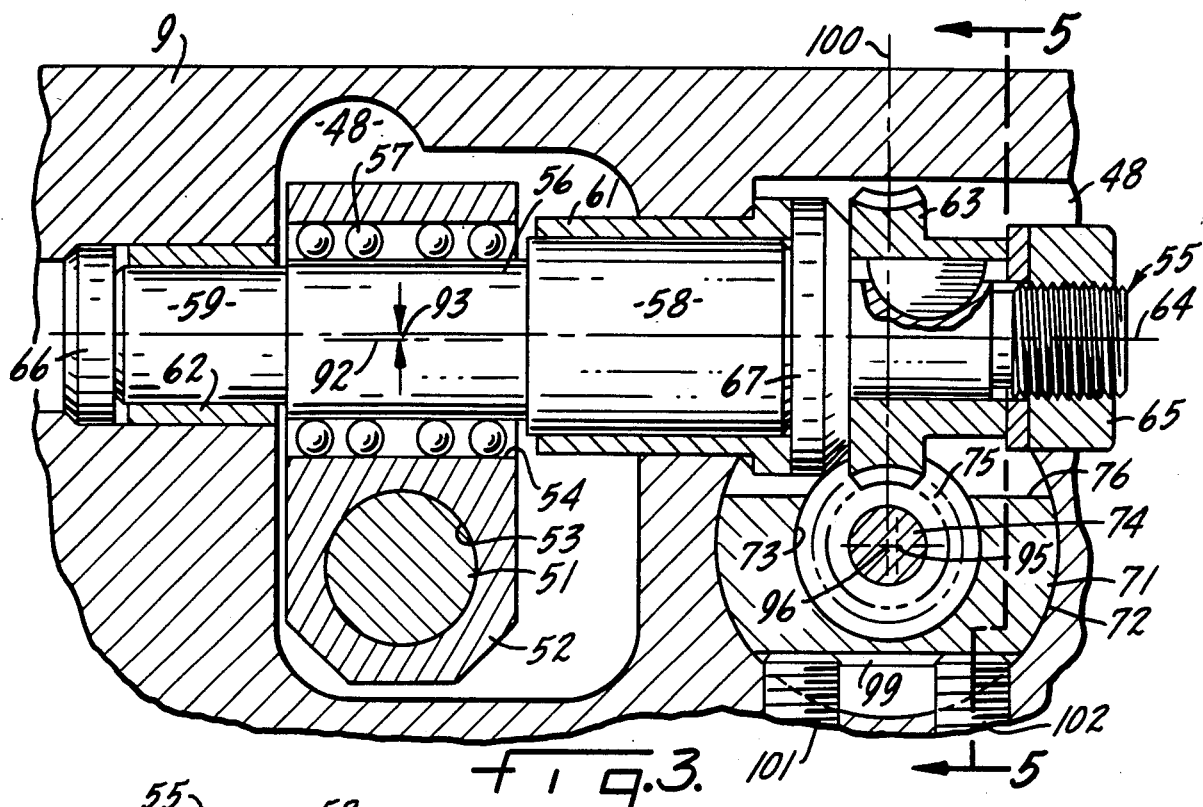
Fig. 3.
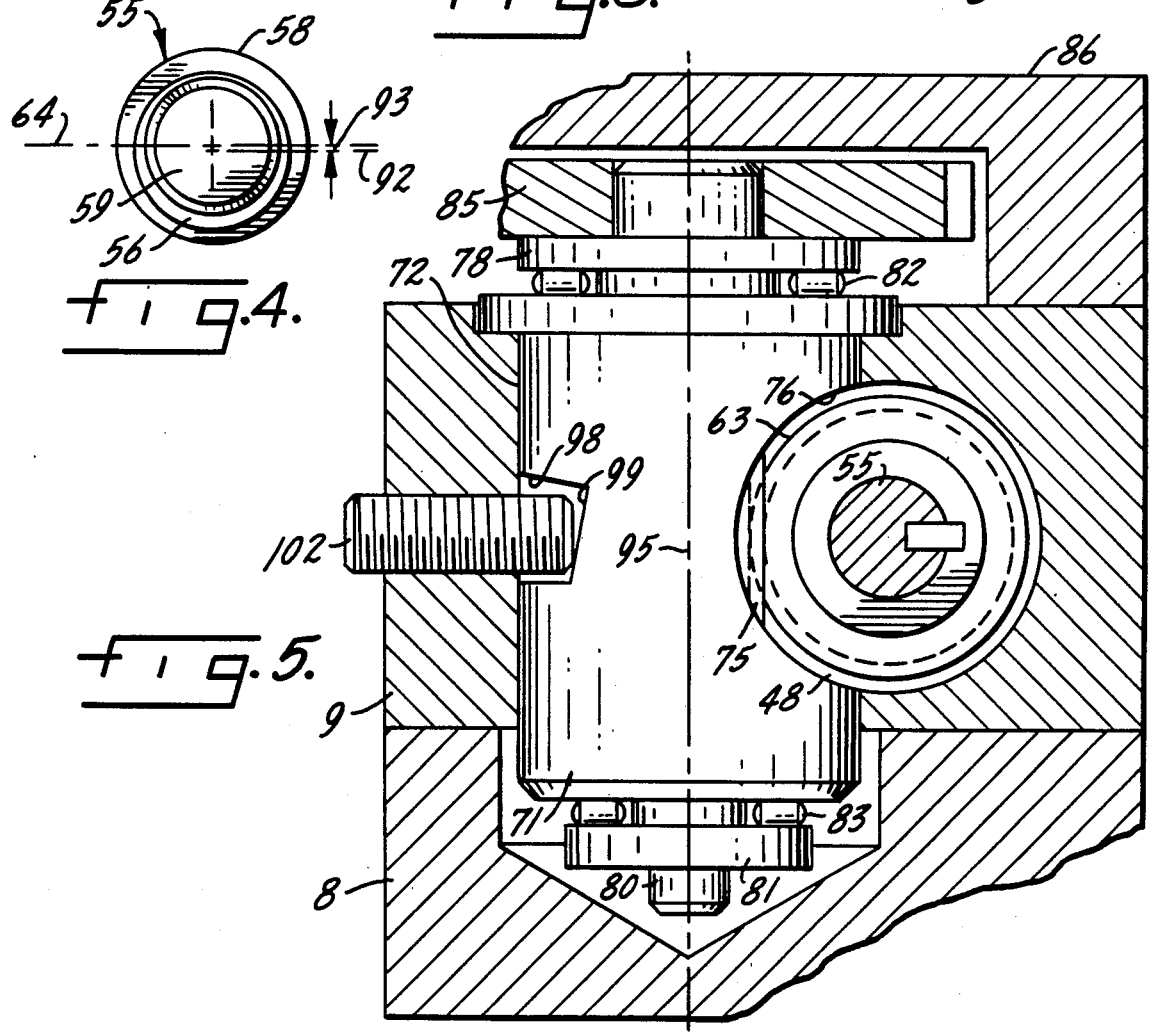
Fig. 4.
Fig. 5.

CUTTING TOOL HOLDER

BACKGROUND OF THE INVENTION

Our invention relates to the machining of solids, and more particularly to an improved cutting tool holder that permits extremely precise adjustment of the tip of a cutting tool.

When a machine tool is used to cut metal to shape, the tip of the cutting tool will become worn or dull. The tool must be sharpened and repositioned, or merely adjusted, so that the tip has its exact original location. Also, precision machining operations require very fine adjustment of the cutting tip to tolerances of 0.0001 inch or less. Prior cutting tool holders were not always able to hold to such small tolerances because of excessive friction or backlash between parts, or because their operations depended on the flexing of a metal part.

OBJECTIVES OF THE INVENTION

Accordingly, it is an object of our invention to provide an improved cutting tool holder for machine tools.

Another object is to provide a radially adjustable tool holder for boring, turning, facing and other maching operations that can be adjusted manually or by motor.

Another object is to minimize backlash between the moving parts of a cutting tool holder.

Another object is to eliminate sudden or jerking movement of a cutting tip and to reduce the force necessary for movement of the tip by replacing sliding friction between major parts of a tool holder with rolling friction.

Another object is to employ direct positive contact between the actuating parts of a tool holder.

Another object is to reduce machine down time when a cutting tool or its holder must be repositioned, changed, or repaired.

Another object is to provide a cutting tool holder that is capable of fast, accurate adjustment but resists inadvertant movement caused by extraneous external forces.

Another object is to provide a relatively simple, low cost, durable, easily maintained, highly accurate cutting tool holder for machine tools that is usable for left or right hand machining operations and which does not possess defects found in similar prior art devices.

Other objects and advantages of our invention will be found in the specification and claims, and the scope of our invention will be set forth in the claims.

DESCRIPTION OF THE DRAWING

FIG. 1 is a partially broken away top plan partially cross sectional view of an embodiment of our invention.

FIG. 2 is a partially broken away, partially cross sectional side view taken along the line 2—2 in FIG. 1.

FIG. 3 is an enlarged fragmentary cross sectional view of the eccentric shaft and some of the associated parts of our invention.

FIG. 4 is an end view of a portion of the eccentric shaft shown in FIG. 3.

FIG. 5 is a cross sectional view taken along the line 5—5 in FIG. 3.

DESCRIPTION OF THE INVENTION

The drawing shows a cutting tool holder 1 in accord with our invention for adjustably attaching a cutting tool 2, to a machine tool 4 such as a lathe. Tool holder 1 includes an elongated, stationary bottom or mounting plate 8 and an elongated coetensive top or pivot plate 9. Mounting plate 8 is generally positioned on machine tool 4 by a cylindrical dowel 11 extending upwardly from maching tool 4 and passing through a circular hole 12 on the centerline 5 of plate 8. A cylindrical rough adjusting pin 13 passes through a hole 14 on the centerline 5 and an eccentric cylindrical projection 16 on pin 13 extends into a hole 17 in machining tool 4. The centerline 6 of projection 16 is offset from the center line 7 of pin 13 by about 0.02 to 0.04 inch to permit controlled rough adjustment of mounting plate 8. Pin 13 is accessable via a hole 18 through pivot plate 9 for adjustment by a suitable tool, such as an Allen wrench. Plate 8 may be secured to machine tool 4 by any conventional means such as bolts 19 which pass through holes in plate 8 and are threaded into tapped holes in machining tool 4, and cutting tool 2 may be secured to pivot plate 9 by any conventional means such as a bolt 20 threaded into a tapped hole in the top of plate 9.

A pivot pin 21 adjacent end 3 of tool holder 1 facilitates relative movement of plates 8 and 9. Pivot pin 21 includes a relatively large diameter cylindrical portion 22 having a head or shoulder portion 23, and a relatively small diameter cylindrical dowel portion 24 centered in and projecting from headed portion 22. Pin 21 passes through a circular hole 25 on centerline 5 and dowel portion 24 is received in circular aperture 26 on the centerline 10 of plate 9. Bolts 27 that pass through holes through headed portion 22 are threaded into tapped holes in plate 9 for holding plates 8 and 9 tightly.

A circular shoulder 28 surrounds head portion 22 and defines bearing surfaces 29 and 30. Relative movement of plates 8 and 9 is facilitated by first rolling means such as roller bearings 31 and 32 located between head 23 and bearing surface 29, and between bearing surface 30 and the bottom of plate 9.

Plates 8 and 9 are also held tightly relative to each other by a cylindrical loading screw 33 that passes through a circular hole 34 located on centerline 5 and is threaded into a tapped hole 35 located on centerline 10. A hole in the top of plate 9 defines bearing surface 36 surrounding screw 33, and slots across the bottom of plate 9 define bearing surfaces 37 and 38. The head 39 of screw 33 bears against a washer 40. Second rolling means such as ball bearings 41 and 42 are held, respectively, between bearing surface 36 and washer 40 and bearing surfaces 37 and 38 and the top of plate 8. A cylindrical spacer sleeve 43 receives screw 33 between washer 40 and the top of plate 8.

Screws 27 and screw 33 should be tightened to load the first and second bearing means a predetermined amount sufficient to prevent inadvertant relative movement of plates 8 and 9. The length of spacer sleeve 43 and the distance between the upper surface of shoulder 23 and end surface 46 of pivot pin 21 should be predetermined so that there is a clearance of about 0.0005 to 0.001 inch between plates 8 and 9 after screws 27 and 33 have been preloaded. This ensures that essentially the only friction to be overcome between plates 8 and 9 to cause relative movement is rolling friction.

The components which move pivot plate 9 relative to mounting plate 8 are located in an irregularly shaped cavity 48 located at the other end 7 of plate 9. Cavity 48 is exposed to the outside of plate 9 through a top opening 49 and an end opening 50. A force transmitting pin 51 is immovably anchored in plate 8 to one side of centerline 5 near its other end 7, and pin 51 extends upwardly into cavity 48 with its central axis 44 parallel to the central axis 45 of pivot pin 21. A connecting block 52 located in cavity 48 has a first bore 53 that rotatably and slidably receives pin 51, and a second bore 54 extends through block 52 perpendicularly to bore 53.

A shaft 55 has a cylindrical eccentric central portion 56 journaled in bore 54 in third rolling bearing means, such as ball bearings 57. First and second cylindrical bearing portions 58 and 59 of shaft 55 extend from opposite sides of eccentric central portion 56, and first portion 58 has a larger diameter than second portion 59. Bearing portions 58 and 59 are journaled in bushings 61 and 62 that are secured in pivot plate 9. A worm gear or concave gear 63 is keyed on shaft 55 near one end, and gear 63 is in a plane generally perpendicular to the centerline 64 of shaft 55 and its bearing portions 58 and 59. A nut 65 threaded on the end of shaft 55 holds gear 63 in place. A plug 66 may be located in the same hole as bushing 62. A shoulder 67 on shaft 55 accurately positions shaft 55. A plug 69 threaded into end opening 50 closes opening 50 and holds shaft 55 in place. Connecting block 52 rotates on pin 51, and also may move up and down on pin 51 to compensate for relative movement of plates 8 and 9 resulting from turning of shaft 55.

A relatively large removable bushing 71 has a slip fit into cavity 48 adjacent end 7 of plate 9. Bushing 71 has a generally cylindrical outside surface 72 and a generally circular central passage 73 through it. A rod 74 extends through passage 73, and rod 74 is parallel to pivot pin 51. A spiral gear or worm 75 is secured on rod 74, and an opening 76 through one side of bushing 71 exposes a portion of gear 75 for mating with concave gear 63. At one end, rod 74 may have an enlarged head portion 77 surrounded by a circular shoulder 78, and a tapped hole 79 at its other end. A screw 80 threaded into hole 79 holds a circular washer 81. Tightening of screw 80 causes a predtermined load to be applied to fourth rolling means, such as roller bearings 82 and 83, which are held, respectively, between shoulder 78 and one end of bushing 71 and washer 81 and the other end of bushing 71. The end of bushing 71 including screw 80 and washer 81 may extend into a cavity 84 in the top surface of plate 8. A relatively large spur gear 85 is secured to head portion 77 at the end of rod 74. A top cap 86 for closing the top of cavity 48 is secured to pivot plate 9 by conventional means, such as bolts 87 threaded into tapped holes in plate 9. Means external of pivot plate 9 for turning gear 85 may include a shaft 88 passing through and journalled for rotation in cap 86. A relatively small spur gear 89 on one end of shaft 88 mates with gear 85 and a hand knob 90 on the other end of shaft 88 permits an operator to actuate tool holder 5. The roller bearings and ball bearings may be used with conventional races and retainers where needed.

Rotation of knob 90 rotates spur gears 89 and 85, which turns rod 74 and spiral gear 75. Movement of gear 75 rotates concave gear 63 and shaft 55, which results in rotation of eccentric portion 56 in connecting block 52. Since force transmitting pin 51 in block 52 is anchored in stationary mounting block 8, the movement of eccentric portion 56 is transmitted through bushings 61 and 62 to pivot block 9, and thus turns block 9 around pivot pin 21. As shown in FIGS. 3 and 4, the centerline 92 of eccentric portion 56 is off set from the centerline 64 of shaft 55 by a predetermined distance 93. The distance 93 is the maximum distance that pivot block 9 can move with respect to mounting block 8. For mass production maching operations, the distance 93 should be in the range of about 0.01 to 0.03 inches and preferably about 0.015 inches. The distance between force transmitting pin 51 and pivot pin 21 should be several times greater (e.g. ten) than the distance between pivot pin 21 and end 3 of pivot plate 9 where tool 2 is attached. This enables the machine tool operator to make very small adjustments in the distance moved by the tip of tool 2 because the distance moved at end 3 will be only a small fraction of the distance eccentric portion 56 causes end 7 to move.

Backlash between spiral gear 75 and concave gear 63 can be minimized by having the centerline 95 of the cylindrical outside surface 72 of bushing 71 off set from the centerline 96 of rod 74 a predetermined distance 97. Distance 97 should be in the range of about 0.02 to 0.04 inch, and preferably about 0.03 inch. This offset can be attained by locating central passage 73 off center in bushing 71 by the predetermined distance 97. Centerlines 95 and 96 should be parallel. A transverse slot 98 extends across the outside surface 72 opposite opening 76. Slot 98 should have a surface that intersects the plane 100 of concave gear 63. Preferably, however, slot 98 will have a slanting surface 99 that lies in a plane which intersects centerline 95 in an accute angle in the range of five to twenty degrees, but preferably about ten degrees. Bushing 71 and hence spiral gear 75, can be moved toward and away from concave gear 63 by means threaded through a side of pivot plate 9, such as a pair of parallel screws 101 and 102 located in holes tapped in plate 9. Screws 101 and 102 should be separated from each other along a line that is generally perpendicular to centerline 95, and should be of sufficient length that their inner ends bear against slanting surface 99. When screws 101 and 102 are advanced or retracted the same or different amounts, or when one of the screws is advanced and the other is retracted, spiral gear 75 can be moved into a mating relationship with concave gear 63 that minimizes backlash. Since surface 99 slants at an accute angle with respect to centerline 95, screws 101 and 102 also hold bushing 71 down in cavity 48.

It has thus been shown that by the practice of our invention, cutting tool holder 1 can be held tightly in place yet accurately adjusted with only a small amount of force because its major components move on rolling surfaces. The direct positive contact between bearing portions 58 and 59 and pivot plate 9 and between eccentric central portion 56 and connecting block 52 on force transmitting pin 51 enable plate 9 to be moved without slippage or flexing of any parts. Backlash between the major gears can be minimized by screws 101 and 102 acting on slot 98 because the centerlines 95 and 96 are offset by the predetermined distance 97. The parts that are subject to major wear are located in cavity 48, and hence can be replaced or repaired through openings 49 and 50, without necessitating complete disassembly of tool holder 1.

While our invention has been described with reference to a particular embodiment, it is not intednned to illustrate or describe herein all of the equivalent forms or ramifications thereof. For example, motor driven or other automatic external actuating mechanisms may be used in place of manual knob 90. Also, the words used are words of description rather than limitation, and various changes may be made without departing from the spirit or scope of the invention disclosed here. We intend that the appended claims cover all such changes as fall within the true spirit and scope of our invention.

What we claim as new and desire to secure by Letters Patent of the United States is:

1. A cutting tool holder for a machine tool, comprising:
   (A) a mounting plate for attachment to said machine tool; a pivot pin having its central axis extending perpendicularly from said mounting plate adjacent one end thereof; and means for holding said mounting plate on said machine tool;
   (B) a pivot plate having a hole adjacent one end thereof receiving said pivot pin; said pivot plate being adjacent said mounting plate; there being a cavity in said pivot plate at its other end; means in said cavity anchored to said mounting plate; a shaft having an eccentric portion rotatably journalled in the anchored means, said shaft having a bearing portion journalled for rotation in said pivot plate, said eccentric portion having a centerline that is a predetermined distance from the centerline of said bearing portion; and gear means on said shaft; said center line of said eccentric portion and said centerline of said bearing portion being in planes that are perpendicular to said central axis of said pivot pin;
   (C) means for turning said gear means, so that turning of said gear means causes rotation of said shaft so as to move said eccentric portion of said shaft in said anchored means and to thereby cause said pivot plate to pivot around said pivot pin;
   (D) means for attaching a cutting tool to said one end of said pivot plate;
   (E) the distance between said cavity in said other end of said pivot plate and said pivot pin being several times greater than the distance between said one end of said pivot plate and said pivot pin, whereby the distance moved by said cutting tool when said pivot plate pivots around said pivot pin is only a small fraction of the distance moved by said other end; and
   (F) means for holding said mounting plate and said pivot plate in the required position.

2. The invention defined in claim 1, further comprising means for minimizing backlash between said gear means and said means for turning said gear means comprising a bushing in said cavity journalling said means for turning said gear means, a slot extending across a side of said bushing, said slot having a surface in a plane that intersects the plane of said gear means; means threaded through said pivot plate that bears against said surface of said slot for moving said gear means.

3. The invention defined in claim 2, wherein said anchored means in said cavity comprises a force transmitting pin extending from said mounting plate parallel to said pivot pin.

4. The invention defined in claim 1 wherein said eccentric portion of said rod is its central portion and said bearing portions comprise first and second cylindrical portions extending from opposite sides of said eccentric portion, and said first and second bearing portions have the same centerline.

5. The invention devined in claim 4, wherein said first and second bearing portions have different diameters.

6. The invention defined in claim 5, further comprising said first bearing portion being nearer to said gear means than said second bearing portion, and said first bearing portion having a larger diameter than said second bearing portion.

7. A cutting tool holder for a machine tool, comprising:
   (A) a mounting plate for attachment to said machine tool; a pivot pin extending perpendicularly from said mounting plate adjacent one end thereof; a force transmitting pin extending from said mounting plate parallel to said pivot pin, said force transmitting pin being located near the other end of said mounting plate; and means for holding said mounting plate on said machine tool;
   (B) a pivot plate having a hole adjacent one end thereof receiving said pivot pin; said pivot plate lying on top of said mounting plate; there being a cavity in said pivot plate at its other end, said cavity being exposed to the outside of said pivot plate; a connecting block in said cavity, said connecting block having a first bore receiving said force transmitting pin and a second bore extending through said connecting block perpendicularly to said force transmitting pin; a shaft having a cylindrical eccentric central portion journalled in said second bore, first and second cylindrical bearing portions on said shaft extending from opposite sides of said eccentric central portion, said first and second bearing portions being journalled in said pivot plate, said first and second bearing portions being on the same centerline; said eccentric central portion having a centerline that is offset a predetermined distance from said centerline of said first and second bearing portions; a concave gear on said shaft adjacent one of its ends, said concave gear being in a plane that is generally perpendicular to said centerline of said bearing portions;
   (C) a bushing in said cavity having a rod extending therethrough, said rod being parallel to said pivot pin; a spiral gear on said rod, an opening in one side of said bushing that exposes said spiral gear for mating with said concave gear; and a spur gear on an end of said rod;
   (D) means external of said pivot plate for turning said spur gear, so that turning of said spur gear causes said spiral gear to rotate said concave gear and said shaft, thus rotating said eccentric portion of said shaft against said force transmitting pin so as to cause said pivot plate to pivot around said pivot pin;
   (E) means for attaching a cutting tool to said one end of said pivot plate;
   (F) the distance between said force transmitting pin and said pivot pin being several times greater that the distance between said one end of said pivot plate and said pivot pin, whereby the distance moved by said cutting tool when said pivot plate pivots around said pivot pin is only a small fraction of the distance moved by said other end; and
   (G) means for holding said mounting plate and said pivot plate in the required position.

8. The invention defined in claim 7, further comprising means for minimizing backlash of said concave and spiral gears comprising a slot extending across the other side of said bushing, said slot having a surface in a plane that intersects the plane of said concave gear; means threaded through said pivot plate that bears against said surface of said slot for moving said spiral gear toward and away from said concave gear.

9. A cutting tool holder for a machine tool, comprising:
(A) an elongated mounting plate for attachment to said machine tool; a pivot pin extending perpendicularly from said mounting plate adjacent one end thereof; a force transmitting pin extending from said mounting plate parallel to said pivot pin, said force transmitting pin being located near the other end of said mounting plate; and means for holding said mounting plate on said machine tool;
(B) an elongated pivot plate having a hole adjacent one end thereof receiving said pivot pin; said pivot plate lying on top of and being coextensive with said mounting plate; there being a cavity in said pivot plate at its other end, said cavity being exposed to the outside of said pivot plate; a connecting block in said cavity, said connecting block having a first bore rotatably receiving said force transmitting pin and a second bore extending through said connecting block perpendicularly to said force transmitting pin; a shaft having a cylindrical eccentric central portion journalled in said second bore; first and second cylindrical bearing portions on said shaft extending from opposite sides of said eccentric central portion, said first and second bearing portions being journalled in bushings secured in said pivot plate, said first and second bearing portions being on the same centerline, said first bearing portion having a larger diameter than said second bearing portion; said eccentric central portion having a centerline that is offset a predetermined distance from said centerline of said first and second bearing portions; a concave gear on said shaft adjacent one of its ends, said concave gear being in a plane that is generally perpendicular to said cetnerline of said bearing portions;
(C) a removable bushing in said cavity having generally cylindrical outside surface and a generally circular passage therethrough; a rod extending through said passage, said rod being parallel to said pivot pin; a spiral gear on said rod, an opening in one side of said outside surface that exposes said spiral gear for mating with said concave gear; and a spur gear on an end of said rod;
(D) means external of said pivot plate for turning said spur gear, so that turning of said spur gear causes said spiral gear to rotate said concave gear and said shaft, thus rotating said eccentric portion of said shaft in said bushing and thereby causing said pivot plate to pivot around said pivot pin;
(E) means for attaching a cutting tool to said one end of said pivot plate;
(F) the distance between said force transmitting pin and said pivot pin being several times greater than the distance between said one end of said pivot plate and said pivot pin, whereby the distance moved by said cutting tool when said pivot plate pivots around said pivot pin is only a small fraction of the distance moved by said other end; and
(G) means for holding said mounting plate and said pivot plate in the required position comprising a loading screw passing through said pivot plate and being connected to said mounting plate; ball bearings between said plates; a spacer sleeve around said loading screw being tightened so as to load said ball bearings, said loading screw being located closer to said other end than to said one end; roller bearings surrounding said pivot pin and separating said plates adjacent said one end; and threaded means passing through said pivot pin for loading said roller bearings.

10. The invention defined in claim 9, further comprising means for minimizing backlash of said concave and spiral gears comprising said bushing having the centerline of said outside surface offset from the centerline of said circular passage, said centerline being parallel; there being a transverse slot extending across the other side of said outside surface of said bushing, said slot having a surface in a plane that intersects said centerline of said circular passage; a pair of screws threaded through said pivot plate that bear against said surface of said slot for moving said spiral gear toward and away from said concave gear.

11. The invention defined in claim 9, wherein said loading screw further comprises means defining a shoulder extending perpendicularly to its centerline; means defining a ledge on said pivot plate; and said ball bearings being loaded between said shoulder and said ledge.

12. The invention defined in claim 9, wherein said pivot pin further comprises a relatively large head portion and a relatively small dowel portion projecting therefrom; said dowel portion being received in a circular aperture in said pivot plate; means defining a shoulder on said mounting plate surrounding said head portion, and said roller bearings being located between said head portion and said shoulder portion.

13. A cutting tool holder for a machine tool comprising:
(A) a mounting plate for attachment to a machine tool; a pivot pin extending perpendicularly to said mounting plate and means for holding said mounting plate on said machine tool;
(B) a pivot plate having a hole receiving said pivot pin, there being a cavity in said pivot plate; and means for attaching said cutting tool to said pivot plate;
(C) means for moving said pivot plate with respect to said mounting plate comprising first gear means in said cavity connected to said mounting plate, second gear means in said cavity connected to said pivot plate for causing movement of said pivot plate around said pivot pin; and
(D) means for minimizing backlash between said first and second gear means comprising a bushing slip fitting in said cavity, said bushing having a generally cylindrical outside surface and a generally circular passage therethrough, said second gear means being journalled in said passage, an opening in one side of said outside surface that exposes said second gear means for mating with said first gear means; said bushing having the centerline of said outside surface offset from the centerline of said circular passage, said centerlines being parallel, there being a transverse slot extending across the other side of said outside surface, said slot having a surface in a plane that intersects the plane of said second gear means; and means threaded through said pivot block that bears against said surface of said slot for moving said second gear means toward and away from said first gear means.

14. The invention defined in claim 13 wherein said plane of said surface of said slot intersects said centerline of said circular passage.

15. The invention defined in claim 14, wherein said means threaded through said pivot block comprises a pair of parallel screws separated from each other along a line generally perpendicular to said centerline of said circular passage.

16. A cutting tool holder for a machine tool, comprising:
   (A) a mounting plate for attachment to said machine tool; a pivot pin extending perpendicularly from said mounting plate adjacent one end thereof; and means for holding said mounting plate on said machine tool;
   (B) a pivot plate having a hole adjacent one end thereof receiving said pivot pin; said pivot plate being adjacent said mounting plate; there being a cavity in said pivot plate at its other end; a force transmitting pin anchored to said mounting plate and extending from said mounting plate parallel to said pivot pin; a shaft having an eccentric portion rotatably journalled in said force transmitting pin, said shaft having a bearing portion journalled for rotation in said pivot plate, said eccentric portion having a centerline that is a predetermined distance from the centerline of said bearing portion; a connecting block in said cavity having a first bore receiving said force transmitting pin and a second bore receiving said eccentric portion of said shaft; and gear means on said shaft;
   (C) means for turning said gear means, so that turning of said gear means causes rotation of said shaft so as to move said eccentric portion of said shaft in said force transmitting pin and to thereby cause said pivot plate to pivot around said pivot pin;
   (D) means for attaching a cutting tool to said one end of said pivot plate;
   (E) the distance between said cavity in said other end of said pivot plate and said pivot pin being several times greater than the distance between said one end of said pivot plate and said pivot pin, whereby the distance moved by said cutting tool when said pivot plate pivots around said pivot pin is only a small fraction of the distance moved by said other end;
   (F) means for holding said mounting plate and said pivot plate in the required position; and
   (G) means for minimizing backlash between said gear means and said means for turning said gear means comprising a bushing in said cavity journalling said means for turning said gear means, a slot extending across a side of said bushing, said slot having a surface in a plane that intersects the plane of said gear means; and means threaded through said pivot plate that bears against said surface of said slot for moving said gear means.

17. A cutting tool holder for a machine tool, comprising:
   (A) a mounting plate for attachment to said machine tool; a pivot pin extending perpendicularly from said mounting plate adjacent one end thereof; and means for holding said mounting plate on said machine tool;
   (B) a pivot plate having a hole adjacent one end thereof receiving said pivot pin; said pivot plate being adjacent said mounting plate; there being a cavity in said pivot plate at its other end; a force transmitting pin anchored to said mounting plate and extending from said mounting plate parallel to said pivot pin; a shaft having an eccentric portion rotatably journalled in said force transmitting pin, said shaft having a bearing portion journalled for rotation in said pivot plate, said eccentric portion having a centerline that is a predetermined distance from the centerline of said bearing portion; a connecting block in said cavity having a first bore receiving said force transmitting pin and a second bore receiving said eccentric portion of said shaft; and a concave gear on said shaft;
   (C) means for turning said concave gear comprising a rod having a spiral gear thereon that mates with said concave gear and a spur gear for turning said spiral gear, so that turning of said concave gear causes rotation of said shaft so as to move said eccentric portion of said shaft in said force transmitting pin and to thereby cause said pivot plate to pivot around said pivot pin;
   (D) means for attaching a cutting tool to said one end of said pivot plate;
   (E) the distance between said cavity in said other end of said pivot plate and said pivot pin being several times greater than the distance between said one end of said pivot plate and said pivot pin, whereby the distance moved by said cutting tool when said pivot plate pivots around said pivot pin is only a small fraction of the distance moved by said other end;
   (F) means for holding said mounting plate and said pivot plate in the required position; and
   (G) means for minimizing backlash between said concave gear and said means for turning said concave gear comprising a bushing in said cavity journalling said means for turning said concave gear, a slot extending across a side of said bushing, said slot having a surface in a plane that intersects the plane of said concave gear; and means threaded through said pivot plate that bears against said surface of said slot for moving said concave gear.

18. A cutting tool holder for a machine tool, comprising:
   (A) a mounting plate for attachment to said machine tool; a pivot pin extending perpendicularly from said mounting plate adjacent one end thereof; and means for holding said mounting plate on said machine tool;
   (B) a pivot plate having a hole adjacent one end thereof receiving said pivot pin; said pivot plate being adjacent said mounting plate; there being a cavity in said pivot plate at its other end; means in said cavity anchored to said mounting plate; a shaft having an eccentric portion rotatably journalled in the anchored means, said shaft having a bearing portion journalled for rotation in said pivot plate, said eccentric portion having a centerline that is a predetermined distance from the centerline of said bearing portion; and gear means on said shaft;
   (C) means for turning said gear means, so that turning of said gear means causes rotation of said shaft so as to move said eccentric portion of said shaft in said anchored means and to thereby cause said pivot plate to pivot around said pivot pin;
   (D) means for attaching a cutting tool to said one end of said pivot plate;
   (E) the distance between said cavity in said other end of said pivot plate and said pivot pin being several times greater than the distance between said one end of said pivot plate and said pivot pin, whereby the distance moved by said cutting tool when said pivot plate pivots around said pivot pin is only a small fraction of the distance moved by said other end; and (F) means for holding said mounting plate and said pivot plate in the required position comprising a loading screw passing through said pivot plate and being connected to said mounting plate, ball bearings between said plates, a spacer sleeve around said loading screw against which said loading screw is tightened so as to load said ball bearings, and said loading screw being located closer to said other end than to said one end.

19. The invention defined in claim 18, further comprising roller bearings surrounding said pivot pin and separating said plates adjacent said one end, and threaded means passing through said pivot pin for loading said roller bearings.

* * * * *